United States Patent [19]

Lee

[11] Patent Number: 4,997,195

[45] Date of Patent: Mar. 5, 1991

[54] PALLET LOADER

[76] Inventor: Seung-Choon Lee, Dongkyung Apartment 402, 264-2, Shinchun-Dong, Shiheung, Kyunggi-Do, Rep. of Korea

[21] Appl. No.: 420,309

[22] Filed: Oct. 12, 1989

[51] Int. Cl.⁵ .............................................. B62D 63/00
[52] U.S. Cl. ................................. 280/43.12; 180/199; 414/495
[58] Field of Search ...................... 280/43.12; 180/199, 180/200, 202; 414/495; 187/9 R

[56] References Cited

U.S. PATENT DOCUMENTS

| 2,592,091 | 4/1952 | Weaver | 280/43.12 X |
| 2,601,171 | 6/1952 | Schreck | 280/43.12 |
| 3,567,240 | 2/1971 | Brassington | 280/43.12 |
| 3,817,546 | 6/1974 | Sugiura | 280/43.12 |
| 3,843,147 | 10/1974 | Fredricson | 280/43.12 |
| 3,982,767 | 9/1976 | Larsson et al. | 280/43.12 |
| 4,223,901 | 9/1980 | Klemick | 280/43.12 |
| 4,287,959 | 9/1981 | Inman | 280/43.12 X |
| 4,669,561 | 6/1987 | Sheen | 280/43.12 X |

FOREIGN PATENT DOCUMENTS

| 516114 | 2/1955 | Italy | 280/43.12 |
| 101076 | 10/1962 | Norway | 280/43.12 |

Primary Examiner—Robert J. Spar
Assistant Examiner—Robert S. Katz
Attorney, Agent, or Firm—Beveridge, DeGrandi & Weilacher

[57] ABSTRACT

The present invention relates to a pallet loader which can be used for carrying and unloading pallets on which goods are loaded. The pallet loader of the present invention includes an initial wheel-turning driving mechanism which enables a wheel disposed between both side wheels to turn; a jack plate where a control mechanism is provided to control opening and closing of a fluid passage which is provided to pass a fluid between a pump and a hydraulic jack.

3 Claims, 5 Drawing Sheets

PALLET LOADER

FIELD OF THE INVENTION

The present invention relates to a pallet loader which can be used for carrying and unloading pallets on which goods are loaded.

BACKGROUND OF THE INVENTION

In the prior art, forklifter and pallet trucks are used for carrying, loading and unloading pallets on which goods are loaded.

These machineries are mostly in the form of vehicles having an engine. They are very heavy in weight and costly to produce.

They also have the disadvantage of having large bodies that prevent users from using them in small spaces in warehouses. They are also inappropriate as a small loader which can be moved manually.

Devices of the prior art which can be moved manually are disclosed in Korea Utility Model Publication Nos. 84-1992 and 83-2601.

Since they are mainly composed of a linkage system it is not easy for a user to operate them in order to carry heavy loads. Thus when they are used for carrying pallets loaded heavily, they require considerable manual power to be operated. Thus, only some strong people could operate them.

SUMMARY OF THE INVENTION

The present invention is directed to remedy these disadvantages mentioned above.

The object of the present invention is to provide a loader which is easily portable and movable with a small amount of initial manual force so that anyone could operate them to lift and carry loaded pallets.

It is another object of the present invention to provide a simple structure and a small size loader which can be operatable in a narrow space or in a small place.

It is another object of the present invention to provide a loader arranged for carrying, lifting and unloading various forms of pallets.

In order to accomplish these purposes, the present invention comprises an initial turning-wheel driving mechanism which enables a wheel disposed between both side wheels to turn; a jack plate where a control mechanism is provided to control the opening and closing of a fluid passage which is provided to pass a fluid between a pump and a hydraulic jack. Said pump and said jack drive a supporting rod which is inserted into the pallets to lift or put down them.

With the mechanism, an up-down rod is raised by the up-down movements of the pump which follow pulling forward and pushing backward on a handle.

Thus, both supporting rods are raised to lift the loads positioned on the pallets, with rods inserted into pallets, to the desired height. At this moment, if a control mechanism is adjusted, an actuating fluid in the oil-pressured jack is supplied to the initial turning-wheel driving mechanism and both wheels begin to turn to initiate driving. Hereafter, the operator can operate the loader without difficulty with the help of inertia force to move the loader to the desired place.

After that, if the operator lowers pallets by driving the control mechanism, carrying and unloading can be accomplished.

DETAILED DESCRIPTION OF THE PRESENT INVENTION

The present invention will now be described in detail with reference to the accompanying drawings. Referring to the attached drawings, in FIG. 1 the present invention, a pallet loader comprises an initial turning-wheel driving mechanism(100), a pump(2), a hydraulic jack(3), a jack plate(200) having a fluid passage between the initial turning-wheel driving mechanism and the hydraulic jack, and said pump(2) and said jack(3) function to raise both sides of supporting rod(4).

Figure 1:
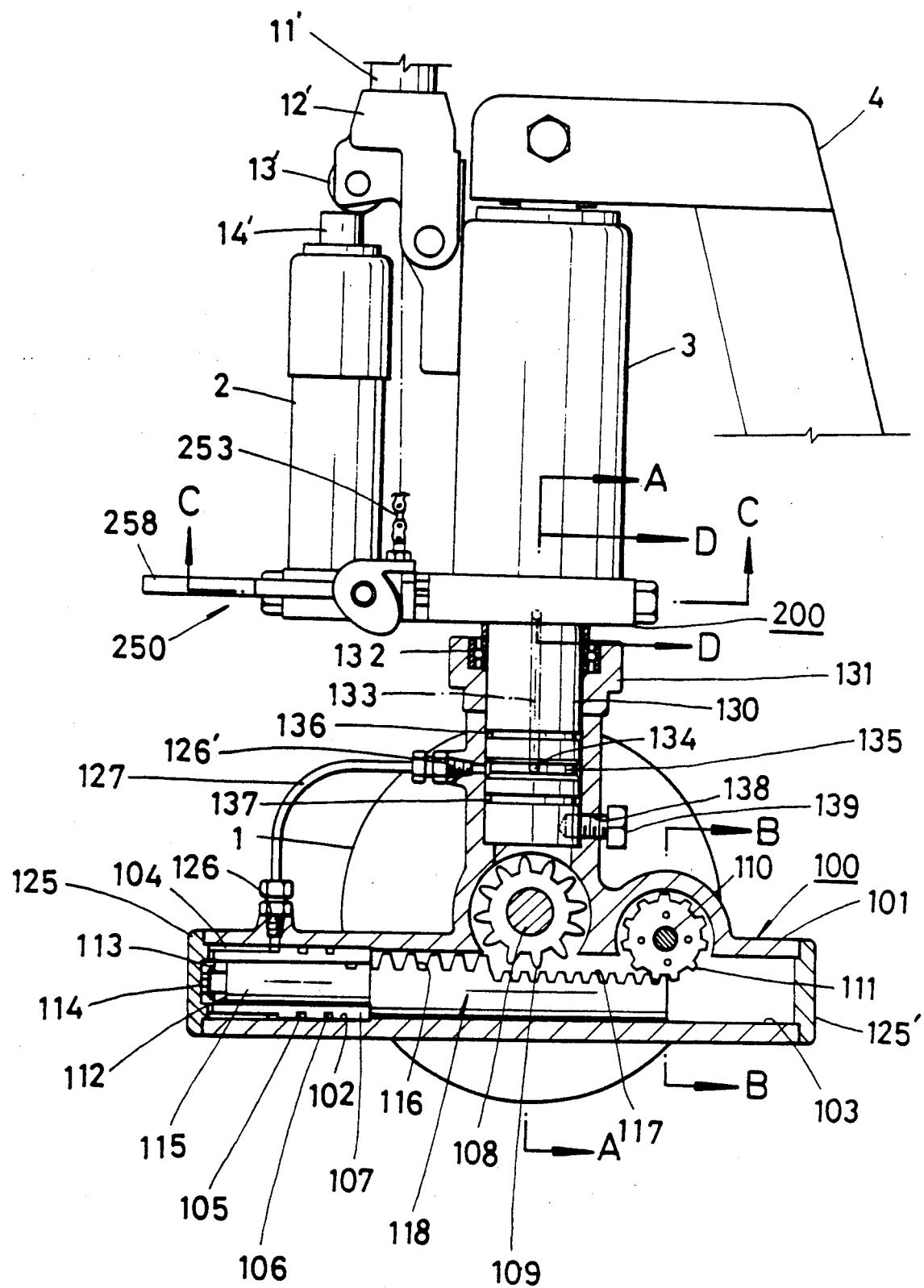
FIG. 1 is a fragmentary longitudinal sectional view of a preferred embodiment in accordance with the present invention.
Figure 2:
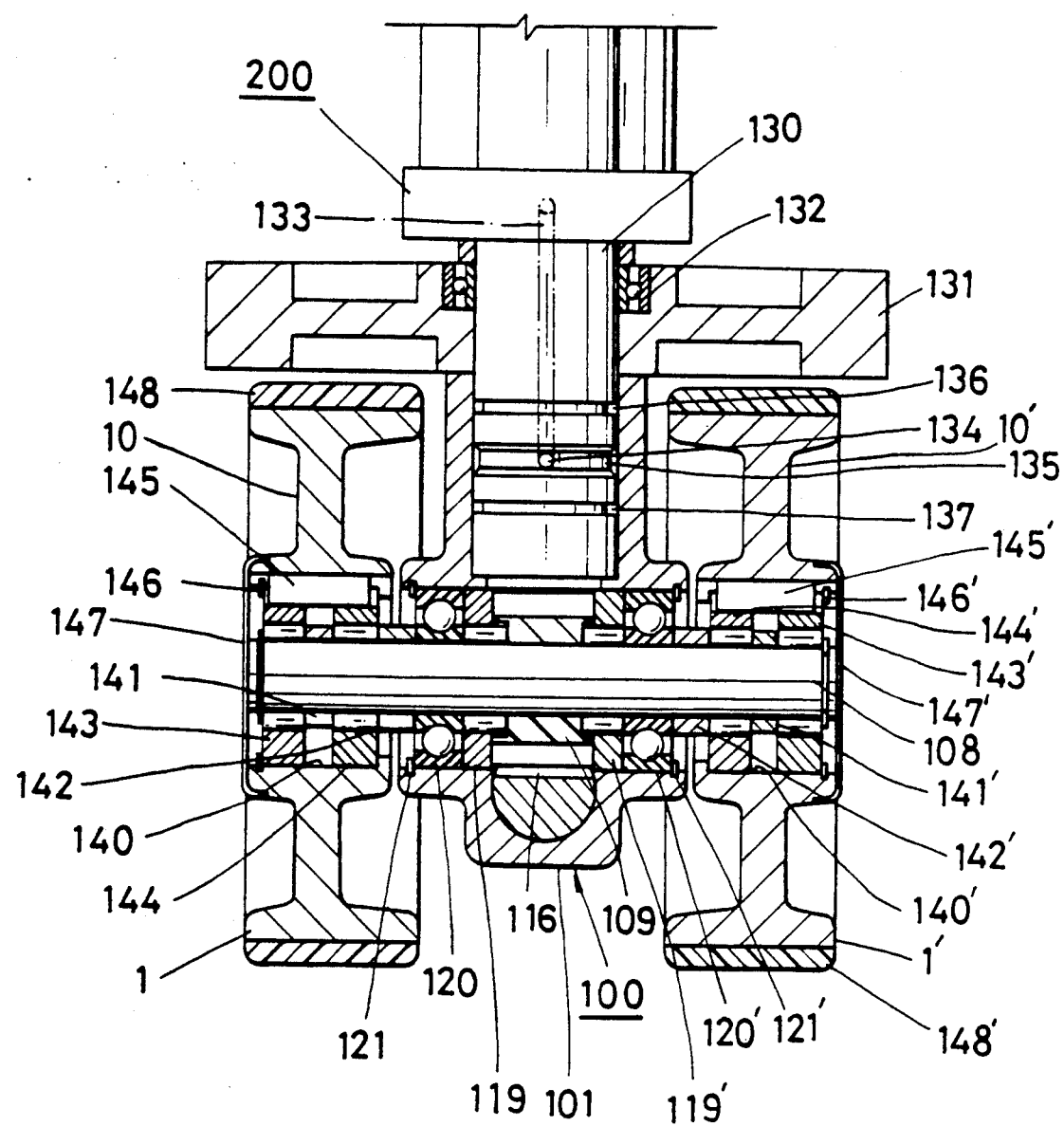
FIG. 2 is a sectional view taken along line A—A of FIG. 1.
Figure 3A:
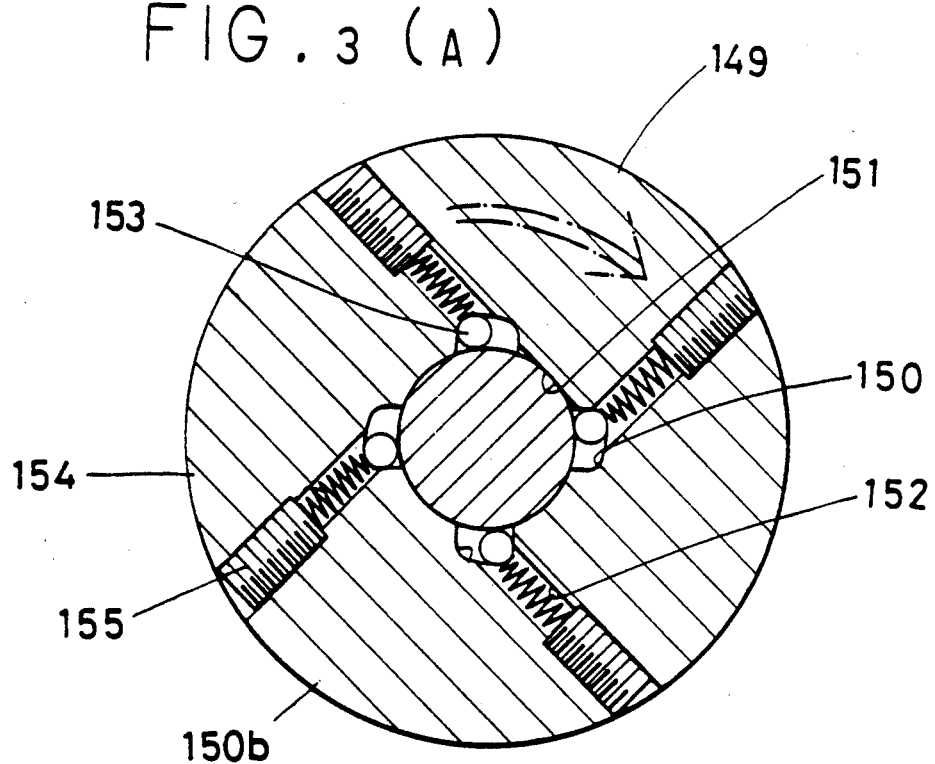
FIGS. 3A and 3B are an enlarged vertical sectional views illustrating a reverse-turn preventing bearing shown in FIG. 2.
Figure 3B:
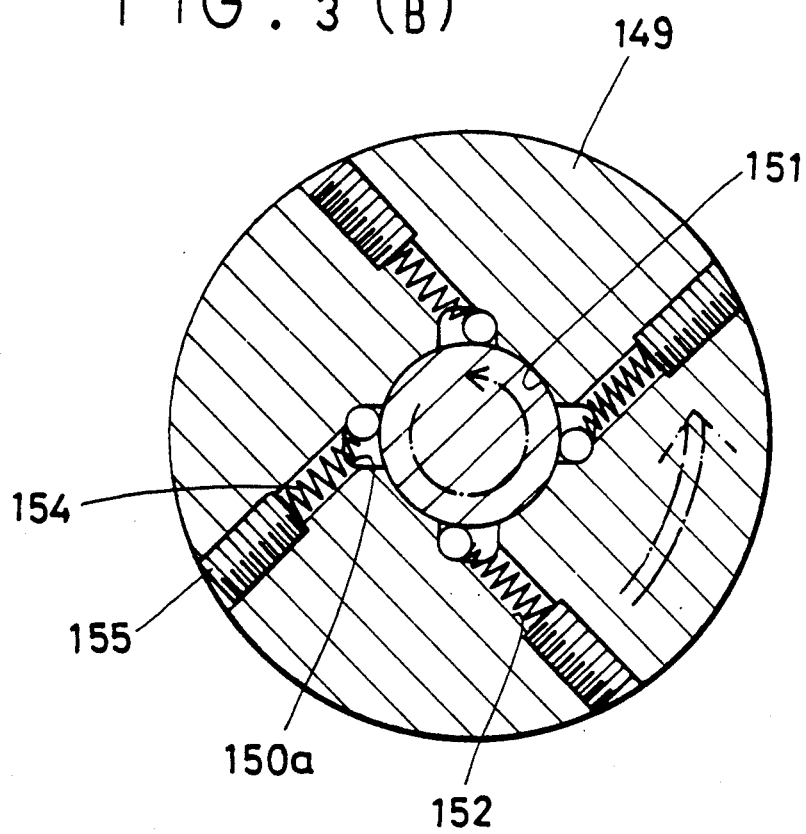
Figure 4:
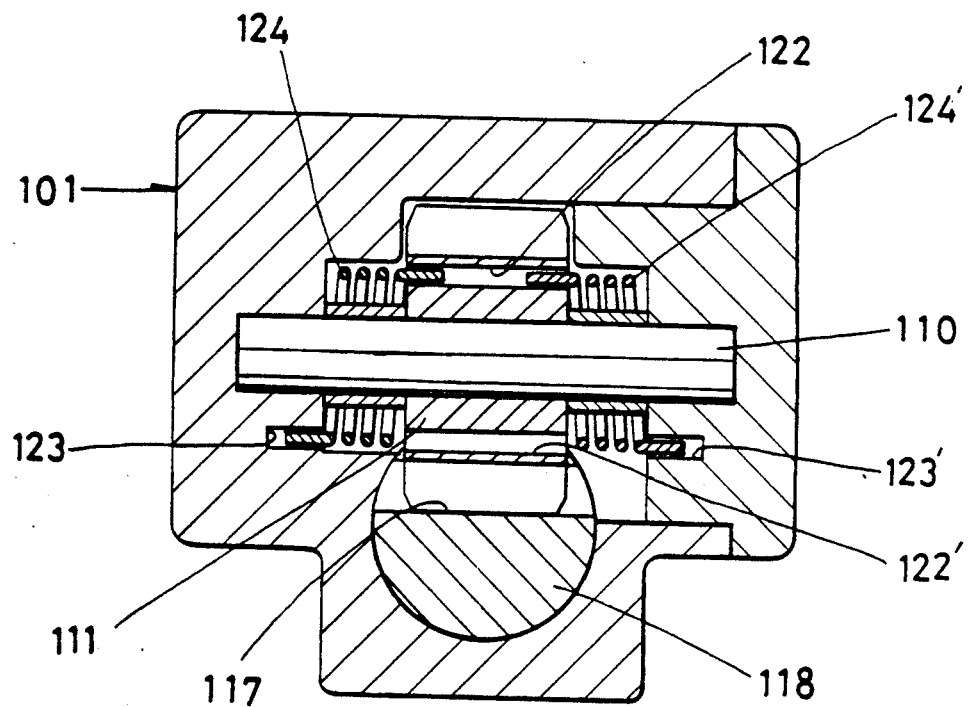
FIG. 4 is a sectional view taken along line B—B of FIG. 1.

As illustrated in FIGS. 1-4, the initial wheel turning driving mechanism comprises a body(101) which fits with a main shaft (130). A bushing groove(102) and an inner space (103) are provided in the body and a fluid passage groove(104) is formed by cutting the periphery of bushing groove(102). In the inner space(103) a main gear(109) is disposed on the shaft (108) far wheels(1,1'), a return gear is formed around the other shaft(110), a plunger(115) on which an urethane packing (112) and a collar(113) are attached with a snap ring(114), is provided in an assembled state, and a driving rack(116) and a return rack(117) are formed with a step. With reference to FIG. 1, the main gear(109) meshes with the driving rack(116) and the return gear meshes with the return rack(117). Referring to FIG. 2, to the right and left side of the main gear(109), reverse-turn preventing bearings(119,119') and ball bearings(120,120') are fixed around the shaft with snap rings(121, 121'). With reference to FIG. 4 pin holes(122, 122') are formed in the return gear(111) and pin holes(123, 123') are also formed so that both ends of springs(124, 124') could be inserted into the pin holes when the springs are in a compressed state. Both side edges of the body(101) engage with covers(125,125') and fluid passing holes(126, 126') are provided for communicating with a pipe(127). The main shaft(130) is provided to be fixed to a jack plate (200). A bearing(132) is interposed into a bearing housing(131) and fixed to the body(101). In the center of the main shaft(130) a vertical fluid passage(133) is provided which connects with a horizontal fluid passage(134) provided therebeneath. The horizontal fluid passage(134) connects with a fluid passage groove(135). O rings(136)(137) are disposed above and below said passage groove(135) and in the one side of the lower end portion of the main shaft(130), a threaded hole is formed to be engaged with an adjusting bolt(139)

that extends through a horizontal hole(138) in the body from the outward direction.

Wheels(1, 1') are mounted around the shaft(108) on the right and left side of the initial turning-wheel driving mechanism (100) and in center holes(140,140') of the shaft. Key holes are provided so that reverse turn preventing bearings(143, 144, 143', 144') can be interposed between collars(141, 142, 141', 142') and fixed by keys(145, 145'). At both edges of the shaft, snap rings(146, 146') are interposed fixedly and covered with covers(147, 147'). Wheel bodies(10, 10') are covered with rubbers(148, 148').

With reference to FIG. 2 and FIG. 3, in the center for a bearing body(149) of reverse-turn preventing bearings(119, 119', 143, 143', 144, 144'), a shaft hole (151) having a plurality of roller grooves(150) is provided and threaded holes(152) are also provided between said grooves (150) and the external surface of the bearing body.

The roller groove(150) defines a curve with a deep curved groove(150a) and a shallow curved groove(150b) to result in connecting said hole(152) with a deep curved groove(150a). Rollers(153) are inserted into the deep roller grooves and springs(154) are also inserted, and then headless bolts(155) engage with said holes(152).

At this time, as illustrated in FIG. 3(A), if the bearing body(149) turns in the direction of the arrow, roller (153) positioned elastically with the spring(154) revolves smoothly in the deep curved groove(150a) and thus the shaft (108) does not turn. Conversely, if the bearing body(149) turns as shown in FIG. 3(B) in the direction of the arrow, roller(153) moves to the shallow curved groove(150b) and the bearing body(149) together with the shaft(108) turns because of the roller forced between the shallow curved groove and the shaft(108).

Figure 5:
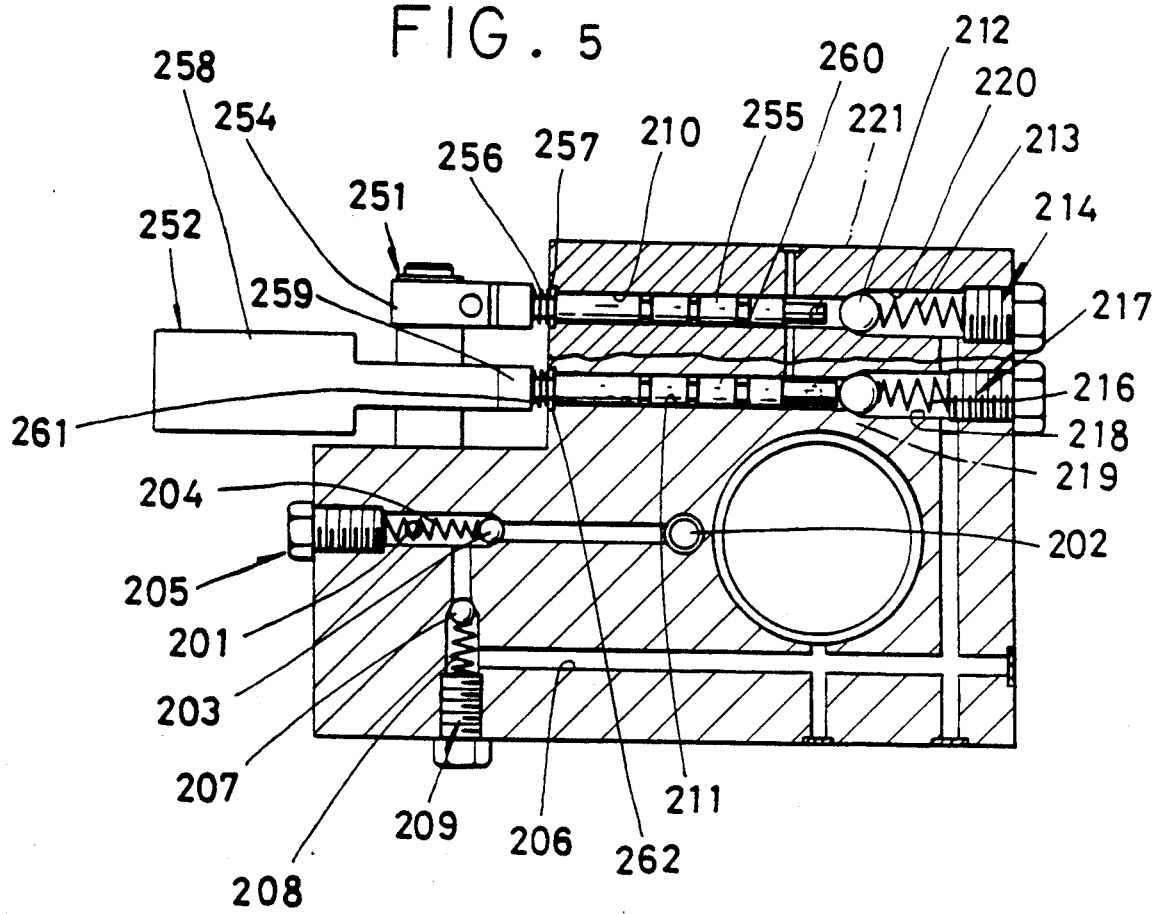
FIG. 5 is a sectional view taken along line C—C of FIG. 1.
Figure 6:
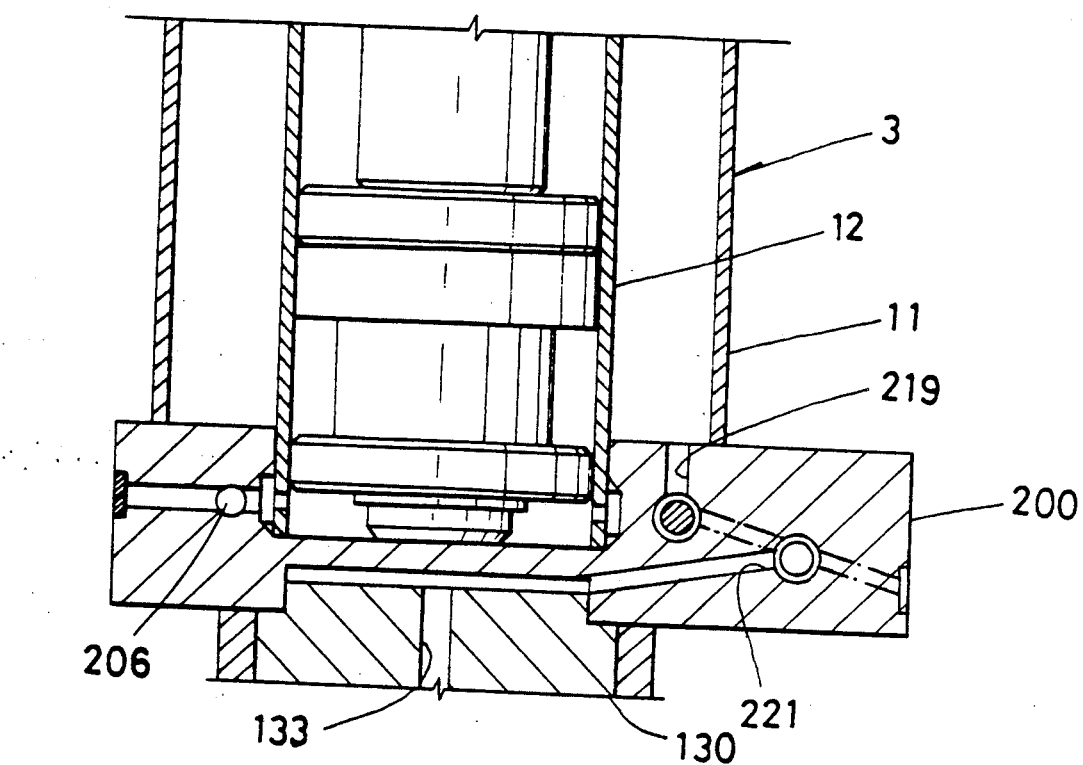
FIG. 6 is a sectional view taken along line D—D of FIG. 1.
Figure 7:
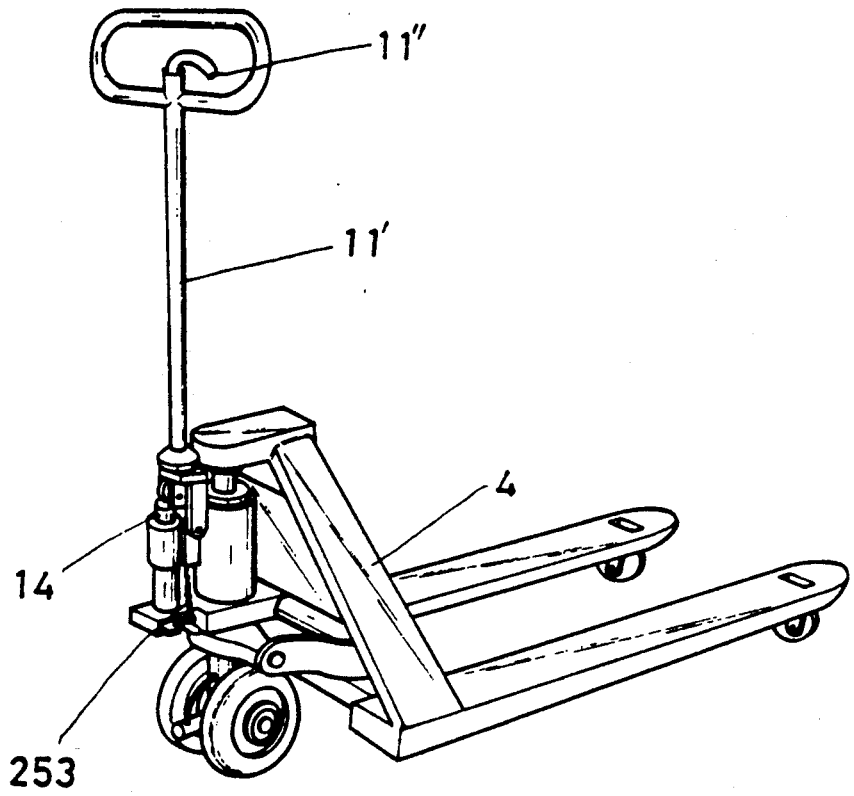
FIG. 7 is a perspective view of pallet loader showing the outer view of the preferred embodiment in accordance with the present invention.

The jack plate(200), as illustrated in FIG. 1, FIG. 5 and FIG. 6, is disposed fixedly between the pump(2), the hydraulic jack(3) and the main shaft(130). In the jack plate(200), a check valve(205) which is composed of ball(203) and spring(204) is provided between a fluid passage(201) connecting with the pump(2) and a fluid passage(202) connecting with the tank(11) of the hydraulic jack(3).

Said check valve(205) connects with a passage(206) which also connects with the inside of the cylinder(12) of the hydraulic jack(3). In said passage(206), check valve(209) consisting of ball(207) and spring(208) is arranged and check valves(214,217) consisting of balls(212,215) and springs(213,216) are arranged to connect to hole(210,211) where a fluid passage control mechanism(250) is installed at one side of the jack plate(200). Whereas, a fluid passage(218) in which check valve(217) is arranged connects with a vertical passage(219), a passage(220) in which check valve(214) is arranged connects with a passage (221) connecting with the central fluid passage(133) of the main shaft(30). A fluid passage control mechanism(250) comprises a driving control mechanism(251) which controls the initial turning wheel driving mechanism(100) and a lowering control mechanism (252) which controls the supporting rod(4). The driving control mechanism including a control rod(255), which is inserted into a hole(210), connects with a cam link (254) mounted at the edge of a chain (253) in a handle(11'). Said cam link(254) is provided to be turnable around the shaft of a cam link(259) for the lowering control mechanism(252). The control rod(255) having a plurality of O rings around it, engages with snap ring(257) and compressed spring(256). Said control rod can move horizontally according to the turning motion of cam link(254), caused by the up and down motion of the chain(253). The lowering control mechanism(252) comprises a pedal(258), the cam link(259) which is connected with the pedal(258), and a control rod(260) which is inserted into the hole(211). Said cam link(259) and said cam link(254) are turnable around the same shaft. Said control rod(260) having a plurality of O rings around it engages with snap ring(262) and compressed spring(261) at the one side. Here, said control rod can be moved according to the motion of the pedal(258) when pressed.

Reference numeral (12') not mentioned as yet, denotes a bracket for hinged connection of the handle(11'). Numeral 13' identifies a roller and a numeral 14 identifies an up-down actuating rod for the pump(2).

The operation of the loader of the present invention will now be described. In operation, if an operator pushes the supporting rod(4) to the pallets to be loaded and turns the handle(11') around the hinge shaft, the roller(13') enables the actuating rod(14) to move up and down repeatedly and in turn by the pumping force of the pump(2), the operating fluid in the tank(11) flows through the passage(202) and flows into the pump(2) via the passage(201), pushing the ball(203). And then the fluid in said pump(2) flows again through the passage(201), pushing the ball(207), and enters into the bottom of the cylinder(12) to raise the inner piston and piston rod so that the supporting rod can be lifted to the desired level. In this raised state, the operator should exert a manual force to move the pallet loader to the desired place.

At this time, if an operator pulls the handle(11') using the driving control mechanism(251), the chain is pulled to turn the cam link(254). Said cam link(254) pushes the control rod(255), compressed by spring(256), and then the operating fluid in the cylinder(12) passes through the passage(220)(221) into the passage(133) in the main shaft (130), the horizontal passage(134), the fluid passage groove (135), a pipe(127) and a fluid passage groove(104). Said pressured fluid exerts a pressure on the plunger(115) that causes the rack(118) to move forward. Thus the driving rack(116) drives the main gear and turns wheels(1,1') disposed on the same shaft. At the same time, the reverse-turn preventing bearings(119, 119', 143, 143') operate as illustrated in FIG. 3(B). Here, the rack(118) can reach the inside of the cover(125') and the loader can be moved easily to the desired position by pushing it to provide the initial driving force required to start it.

When the handle is released, the control rod(255), cam link (254),chain(253)& ball come back to their own positions and the passage is blocked to stop the piston from lowering. Then, there is no oil pressure in the fluid passage(104). The return gear(111) turns reversely due to the compressed force of the spring(124, 124') and the return rack meshed with said return gear(111) retreats to turn the main gear(109) meshed with the driving rack(116) reversely. But, the reverse turn prevention bearings(119, 119') idle as shown in FIG. 3 (A) and the plunger(115) returns to its own position without turning of the shaft(108). If the operator wants to lower pallets following moving of the loader to the desired place, he should press the pedal (258) to turn the cam link(259). Then the control rod(260) is pushed forward and ball(215) retreats so that the passage (218) and the passage(219) are opened. With the opening of the passages, the operating fluid is supplied into the tank(11) so that the piston in the cylinder(12) can be lowered in order to lower pallets. Therefore, the pallet loader of the present invention can carry loaded pallets easily by requiring only a small force for pushing the loader to the desired place since it has the initial turning wheel driving mechanism(100) which can exert a considerable initial driving force.

The pallet loader of the present invention, with its small structure and body, has an advantage of being usable in small and narrow places without restriction.

What is claimed is:

1. A pallet loader comprising:
   (a) an initial wheel-turning driving mechanism comprising a body which fits to a main shaft, said wheel-turing driving mechanism having a bushing groove providing a fluid passage groove, and a bushing having an O ring, disposed in the bushing groove, said mechanism also having an inner space where a main gear is disposed on a first shaft, a return gear is formed on a second shaft, a plunger having an urethane packing and a collar fixed with a snap ring is provided in an assembled state, and a driving rack and a return rack form a rack with a step, said mechanism further comprising a reverse turn preventing bearing and a ball bearing means which are fixed with snap ring onto the first shaft on the left and right sides of the main gear, said return gear having pin holes to hold a spring elastically, said body of said mechanism having a cover for the right and left, fluid passing holes connecting each other with a pipe side edges thereof;
   (b) a pump;
   (c) a hydraulic jack;
   (d) a main shaft being inserted into the upper portion of the body through a bearing in a bearing housing, said main shaft having a central fluid passage a fluid passage groove and, a horizontal passage connecting said central fluid passage and said fluid passage groove, said fluid passage groove of said main shaft being connected to said fluid passage groove of said bushing groove by holes through said body and a pipe connecting said holes, said main shaft further having O rings disposed above and below said fluid passage groove, and a threaded hole engaging with an adjusting bolt which extends through a horizontal hole from the outward direction;
   (e) wheels having center holes and key holes in the center holes, said first shaft having reverse turn preventing bearings thereon, said reverse-turn preventing bearings being interposed between collars on said first shaft and fixed by keys, and snap rings are interposed at right and left edges of the first shaft, said wheels having covers attached thereto and rubbers covering the exterior thereof; and
   (f) a jack plate disposed fixedly between the pump, the hydraulic jack and the main shaft, and comprising a first check valve consisting of a ball and a spring, said first check valve being provided between a first fluid passage pump and a second fluid passage connected with a tank of the hydraulic jack, and being connected to a third fluid passage, a second check valve consisting of a ball and a spring provided in the third passage and third and fourth check valves each consisting of balls and springs and provided between holes where a fluid passage control mechanism is installed at the one side of the jack plate, the fourth check valve being in a fourth fluid passage connected with a vertical passage which connects with the tank, the third check valve being in a fifth passage which connects with the central fluid passage of the main shaft.

2. A pallet loader as claimed in claim 1, wherein said reverse-turn preventing bearings have a shaft hole having a plurality of roller grooves in the center of a bearing body, a threaded hole formed between said groove and the external surface of the reverse-turn preventing bearings, said roller groove consisting of a deep curved groove and a shallow groove connecting with said threaded hole, rollers inserted into the deep groove part of the roller groove with the first shaft extending through the shaft hole, a headless bolt engaged with the threaded hole after a roller is inserted into the deep groove part of the roller groove and a spring inserted into the threaded hole.

3. A pallet loader as claimed in claim 1 wherein said fluid passage control mechanism comprises a driving control mechanism for controlling the initial turning wheel driving mechanism and a lowering control mechanism for lowering a supporting rod;

said driving control mechanism comprising a first cam link mounted at the edge of a chain in a handle, a first control rod inserted into a hole connecting with the first cam link in a pressed state, said first link being turnable about a shaft for a second cam link for lowering the control mechanism, said first control rod having a plurality of O rings around it, a compressed spring and a snap ring engaged therewith;

said lowering control mechanism comprising a pedal, the second cam link being connected with the pedal, a second control rod connected with the second cam link and inserted into a hole, said second cam link being disposed to be turnable around a shaft of said first cam link.

said second control rod having a plurality of O rings around it, a spring mounted elastically at one side with a snap ring.

* * * * *